United States Patent [19]

Martinez

[11] Patent Number: 4,485,077

[45] Date of Patent: Nov. 27, 1984

[54] METHOD FOR CONDUCTING WET GRINDING OF PHOSPHATE ROCK IN A PHOSPHORIC ACID PRODUCTION PLANT

[75] Inventor: John L. Martinez, Brandon, Fla.

[73] Assignee: The Badger Company, Inc., Cambridge, Mass.

[21] Appl. No.: 522,390

[22] Filed: Aug. 12, 1983

[51] Int. Cl.$^3$ .................. C01B 25/16; C01F 1/00; B02C 1/00

[52] U.S. Cl. .................. 423/320; 423/167; 423/319; 241/15; 241/16; 241/21

[58] Field of Search .............. 423/316, 317, 319, 320, 423/321 R, 167; 241/15, 16, 21

[56] References Cited

U.S. PATENT DOCUMENTS

| | | | |
|---|---|---|---|
| 1,894,514 | 1/1933 | Hechenbleikner | 423/320 |
| 3,150,957 | 9/1964 | Seymour et al. | 423/319 |
| 4,044,107 | 8/1977 | Houghtaling | 423/167 |
| 4,126,275 | 11/1978 | Timberlake et al. | 241/21 |
| 4,402,923 | 9/1983 | Lang | 423/320 |

*Primary Examiner*—Gregory A. Heller

*Attorney, Agent, or Firm*—Schiller & Pandiscio

[57] ABSTRACT

A method and system for conducting wet grinding of mined phosphate rock before utilizing the same for the production of phosphoric acid by the wet process method, the method comprising the steps of: (1) wet grinding the phosphate rock in a medium of fresh water at a first stage so as to form a fresh water slurry comprising ground rock and fresh water, (2) sending the fresh water slurry from the first stage to a second stage, (3) dewatering the fresh water slurry at the second stage so as to recover most of the fresh water from the slurry and leave substantially only wet ground rock, (4) recycling the fresh water recovered at the second stage back to the first stage for use in further wet grinding, (5) sending the ground rock from the second stage to a third stage, (6) refluidizing the ground rock at the third stage with acidic pond water so as to form a pond water slurry comprising ground rock and pond water, and (7) thereafter passing the pond water slurry on to a reactor for standard processing so as to produce phosphoric acid by the wet process method.

21 Claims, 1 Drawing Figure

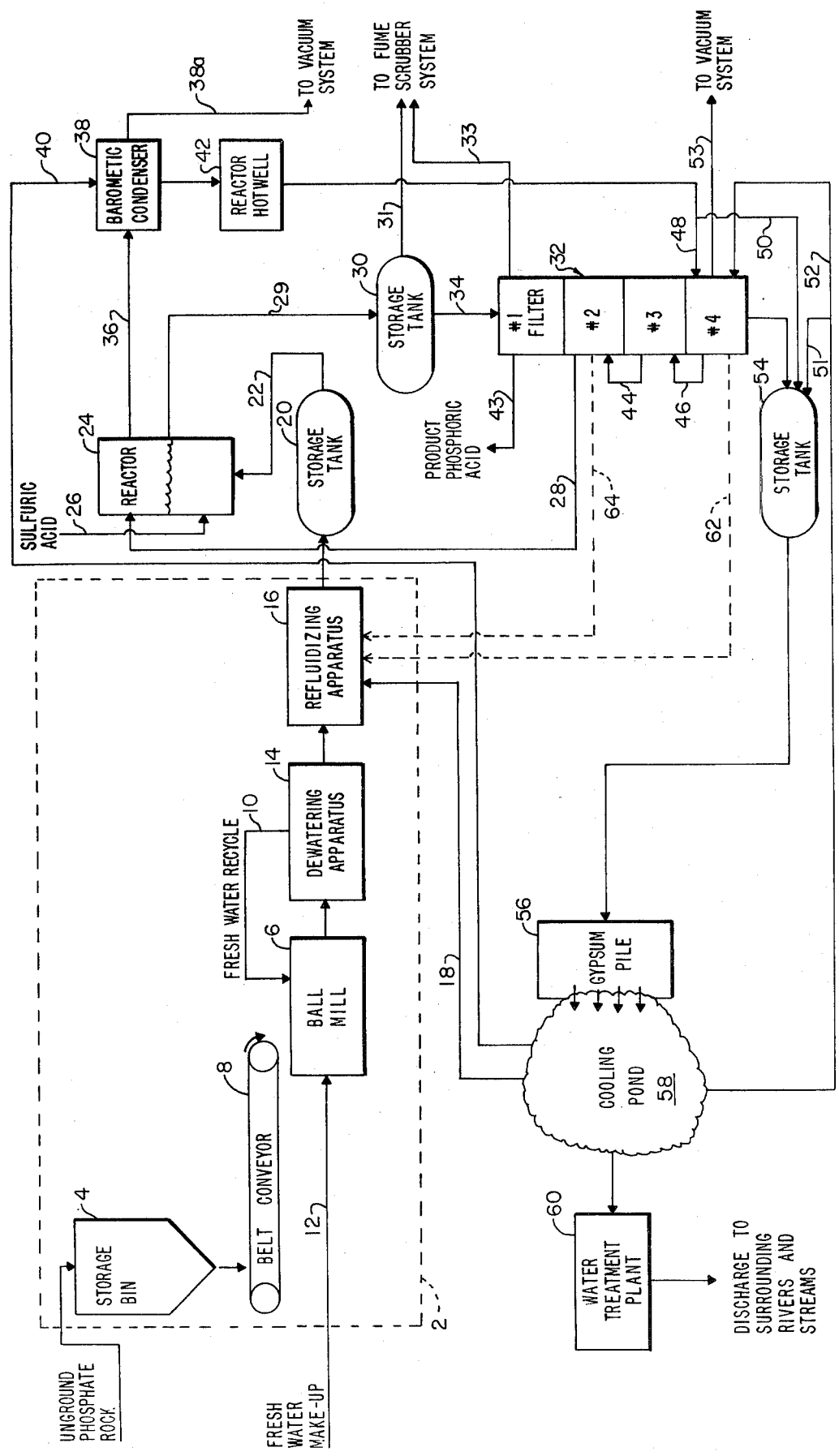
FIG. I

METHOD FOR CONDUCTING WET GRINDING OF PHOSPHATE ROCK IN A PHOSPHORIC ACID PRODUCTION PLANT

FIELD OF THE INVENTION

This invention relates to the production of phosphoric acid in general, and more particularly to the production of phosphoric acid by the so-called "wet process" method.

BACKGROUND OF THE INVENTION

Two major processes have been utilized to produce phosphoric acid from phosphate rock.

In the first process, the so-called "furnace process", mined phosphate rock is combined with coke and silica and reduced at high temperature in a furnace so as to produce elemental phosphorous. Phosphoric acid is then produced by burning the elemental phosphorous with air so as to produce $P_2O_5$, and then absorbing the $P_2O_5$ in water. The phosphoric acid produced by this process is of high purity and suitable for substantially all uses with little or no subsequent treatment. Unfortunately, however, the "furnace process" suffers from the disadvantage that it is a relatively expensive production process.

In the second process, the so-called "wet process" (and the one which is of concern here), mined phosphate rock is reacted with sulfuric acid in a reactor so as to produce phosphoric acid and calcium sulfate (gypsum). More particularly, the mined phosphate rock is typically first crushed in a ball mill (or rod mill) to increase its effective surface area, and then it is fed to a reactor. In the reactor, the phosphate rock is reacted with sulfuric acid, in a medium of phosphoric acid and gypsum, so as to produce additional phosphoric acid and gypsum. The phosphoric acid and gypsum are removed from the reactor as a slurry and passed along to a filter where the phosphoric acid is removed from the slurry. The remaining material in the slurry, primarily gypsum and acidic hot water, is then passed along to a gypsum pile which is located adjacent to a cooling pond. There the slurry is deposited so that the gypsum is added to the gypsum pile while the acidic hot water percolates down into the cooling pond. Thereafter, some of the pond water may be directed back to the production plant for use in cooling operations or in concentration control; the remainder of the acidic pond water is subsequently treated with lime to neutralize its acidity before being discharged into the fresh water systems of the surrounding area.

At one time, the mined phosphate rock was dry ground in the ball mill. However, it was subsequently recognized that wet grinding of the phosphate rock offers a number of advantages over dry grinding. First, dust pollution is largely eliminated. Second, rock drying (necessitated because the unground phosphate rock typically contains between 8 and 12% water by weight when received from the mine) is eliminated. Third, conveying the slurry produced by wet grinding is easier than conveying dry crushed rock. Fourth, metering the slurry produced by wet grinding is easier than metering dry crushed rock.

Accordingly, in U.S. Pat. No. 4,044,107, it was proposed that fresh water be introduced into the ball mill along with the phosphate rock so that wet grinding could be conducted. Thereafter, the fresh water and ground phosphate rock are passed out of the ball mill as a slurry for subsequent introduction into the reactor.

Unfortunately, however, the method proposed in U.S. Pat. No. 4,044,107 suffers from a number of drawbacks. First, it significantly increases the amount of fresh water consumed by the phosphoric acid production plant, since fresh water is required for the rock grinding operation. This can be a serious problem in certain areas, e.g. Florida, which at various times can suffer from a shortage of fresh water. Second, the method proposed in U.S. Pat. No. 4,044,107 suffers from the disadvantage that the introduction of fresh water into the grinding operation results in the production plant producing increased quantities of contaminated water, disposal of which presents a problem. More particularly, the total quantity of contaminated water produced by the production plant tends to increase when using the method proposed in U.S. Pat. No. 4,044,107 for two interrelated reasons. First, the introduction of fresh water into the grinding operation means that more fresh water enters the contaminating production system at the front end of the system, so that more contaminated water is produced on the back end of the system. Second, since the production plant must maintain certain minimum materials concentrations throughout the production process, the addition of fresh water to the system in the grinding operation means that less contaminated pond water can be recycled into the production process during process control. Accordingly, with more fresh water entering the production process and less pond water able to be recycled into the production process, the total quantity of contaminated water present in the cooling pond tends to grow. This contaminated pond water must eventually be neutralized with lime before it can be discharged into the fresh water systems of the surrounding area. Such lime treatment can be costly, particularly when required on a large scale.

U.S. Pat. No. 4,044,187 recognizes that one could substitute recycled contaminated pond water in place of the aforementioned fresh water for use in the wet grinding operation. Such a substitution would tend to solve both of the aforementioned difficulties (i.e., the problems of fresh water consumption and contaminated water production), but it in turn leads to new problems. In particular, the high acidity of the pond water (typically at a pH of between 1.5 and 2) makes it extremely corrosive to a number of the components ordinarily used to fabricate the ball mill, e.g. the forged steel balls and the liner made of a nickel/iron alloy. To forestall such corrosion, the ball mill either must be fabricated from different materials or, alternatively, the highly acidic pond water must be neutralized before being admitted into the ball mill. Neither arrangement is considered entirely satisfactory. In addition, using untreated pond water in the wet grinding operation tends to cause problems with fluorine evolution and with scaling of the rock slurry lines.

U.S. Pat. No. 1,894,514 teaches a concept closely related to the idea of using recycled contaminated pond water in the wet grinding operation. According to this patent, weak phosphoric acid is recycled from the recovery stages of the production plant to the ball mill for use in wet grinding operations. Such an arrangement offers the same benefits as using contaminated pond water for the wet grinding operation (i.e., the problems of fresh water consumption and contaminated water production are eliminated); however, since the weak phosphoric acid being recycled to the ball mill is essentially just a concentrated form of pond water (or, stated more correctly, usually pond water is essentially just a diluted form of weak phosphoric acid), substantially all of the problems introduced by the use of untreated pond water for grinding are encountered when using weak phosphoric acid for grinding, except perhaps that the problems occur on a larger scale.

U.S. Pat. No. 4,181,703 offers yet another technique for conducting wet grinding of the phosphate rock. According to this patent, salt water is used instead of fresh water for the grinding operation. Such a substitution is believed to solve the aforementioned problem of fresh water consumption, but it fails to reduce the total quantity of contaminated water produced by the plant. Thus, the costly problem of water treatment remains. In addition, the use of salt water in the grinding operation can lead to corrosion problems in the ball mill, as well as in other downstream elements in the phosphoric acid production plant. Furthermore, the use of salt water in the grinding operation could create still other problems by possibly interfering with essential chemical reactions occurring in the reactor.

OBJECTS OF THE INVENTION

Accordingly, one of the objects of the present invention is to provide a method for conducting wet grinding of the phosphate rock for the production of phosphoric acid which does not significantly increase the quantity of fresh water consumed by the phosphoric acid production plant.

Another object of the invention is to provide a method or way for conducting wet grinding of the phosphate rock which does not significantly increase the total quantity of contaminated water produced by the phosphoric acid production plant.

Yet another object of the invention is to provide a method or way for conducting wet grinding of the phosphate rock which does not lead to corrosion problems in the grinding apparatus.

Still another object is to provide a method or way for conducting wet grinding of the phosphate rock which does not lead to problems with fluorine evolution and with scaling of the rock slurry lines.

And another object of the invention is to provide a way for conducting wet grinding of the phosphate rock in the production of phosphoric acid which will not interfere with essential chemical reactions occurring in the reactor.

SUMMARY OF THE INVENTION

These and other objects are accomplished by the present invention, which comprises a method for conducting wet grinding of mined phosphate rock before utilizing the same for the production of phosphoric acid by the wet process method. In its preferred embodiment, the invention comprises the steps of (1) wet grinding the phosphate rock in a medium of fresh water at a first stage so as to form a fresh water slurry comprising ground rock and fresh water, (2) sending the fresh water slurry from the first stage to a second stage, (3) dewatering the fresh water slurry at the second stage so as to recover most of the fresh water from the slurry and leave substantially only wet ground rock, (4) recycling the fresh water recovered at the second stage back to the first stage for use in further wet grinding, (5) sending the ground rock from the second stage to a third stage, (6) refluidizing the ground rock at the third stage with acidic pond water so as to form a pond water slurry comprising ground rock and pond water, and (7) thereafter passing the pond water slurry to a reactor for standard or conventional processing so as to produce phosphoric acid by the wet process method.

BRIEF DESCRIPTION OF THE DRAWING

Still other objects and features of the present invention will be more fully disclosed or rendered obvious in the following detailed description of the preferred embodiment of the invention, which is to be considered together with the accompanying drawing:

The accompanying drawing is a block diagram illustrating a complete process for producing phosphoric acid in accordance with the present inven- tion.

DETAILED DESCRIPTION OF THE PREFERRED EMBODIMENT

Looking now at the drawing, there is shown in diagram form a complete process for producing phosphoric acid in accordance with the present invention. The dotted line 2 delineates that portion of the complete production process which pertains to wet grinding operations conducted prior to passing the ground phosphate rock on to the reactor.

Looking now at that portion of the production process which is contained within the dotted line 2, unground phosphate rock (i.e., the phosphate rock as received from the mine) is stored in a storage bin 4 until needed. Then the rock is delivered to a wet ball mill 6 by a belt conveyor 8. In ball mill 6, the phosphate rock is ground in a medium of fresh water so that the ground rock will pass a screen of selected mesh, e.g 30 mesh. Fresh water is introduced into the ball mill 6 via a fresh water recycle line 10 and a fresh water make-up line 12. The output of ball mill 6 is a slurry of ground phosphate rock in fresh water. The fresh water slurry is passed to a dewatering apparatus 14, where most of the fresh water in the slurry is recovered and sent back to ball mill 6 via fresh water recycle line 10. The dewatered phosphate rock is passed to a refluidizing apparatus 16 where the rock is refluidized with acidic pond water delivered by a pond water recycle line 18 from a cooling pond 58. Thereafter, the refluidized phosphate rock is sent as a pond water slurry to a conventional phosphoric acid production system, as will be hereinafter described in further detail.

It is estimated that, by employing efficient dewatering apparatus 14, approximately 80–90% of the fresh water leaving ball mill 6 in the fresh water slurry can be recycled to the ball mill via fresh water recycle line 10. As a result, very little fresh water will have to be added to that portion of the system enclosed by the dotted line 2 via fresh water make-up line 12 once the wet grinding operation is up and running. Thus, fresh water consumption of the entire production plant is significantly reduced. Furthermore, the use of efficient dewatering apparatus 14 also means that very little of the fresh water used in ball mill 6 will make its way out of that portion of the system enclosed by the dotted line 2 in the pond water slurry being sent to the reactor. Thus, the quantity of contaminated water produced by the entire production plant is also minimized, since less fresh water will pass through the contaminating production plant and more contaminated pond water will be able to be recycled through the production plant.

It is to be appreciated that all of the foregoing components (i.e., storage bin 4, belt conveyor 8, wet ball mill 6, dewatering apparatus 14, refluidizing apparatus 16, and the numbered fluid transport lines 10, 12, and 18) are all of the sort well known in the art, and are not in and of themselves new or unique. Rather, it is the way in which these components are combined and utilized in the wet grinding operation which is new and unique. Thus, for example, dewatering apparatus 14 may be any one of the many conventional dewatering mechanisms which are well known in the art, e.g. the dewatering apparatus could comprise vacuum filters, pressure filters, belt filters, or centrifuges. Likewise, refluidizing apparatus 16 may be any one of the many conventional refluidizing mechanisms well known in the art, e.g. an ordinary mixing tank.

The wet grinding apparatus contained within dotted line 2 is intended to be integrated into a complete phosphoric acid production system in the manner shown in the drawing. More particularly, crushed phosphate rock is sent as a pond water slurry from refluidizing apparatus 16 to a storage tank 20, and is thereafter directed as needed into the intake of a reactor 24 via a line 22. In the reactor, the phosphate content of the rock slurry is reacted with sulfuric acid supplied to the reactor via a line 26 in a medium of phosphoric acid and gypsum supplied to the reactor via an acid recycle line 28, so as to produce phosphoric acid and gypsum in accordance with well known chemical reactions. The phosphoric acid and gypsum so produced are drawn off from the reactor via a line 29 to a storage tank 30, where vent gases are collected and sent off to a conventional vent gas or fume scrubber system via a line 31, while the reactor slurry is sent off to a multi-stage filter 32 via a line 34. At the same time, reactor vapors (carrying with them the heat of reaction) are sent off via a line 36 to a barometric condenser 38, where they are condensed by a flow of cool pond water supplied to the condenser via a line 40. The non-condensable gases separated in condenser 38 are sent off via a line 38a to condenser's associated vacuum system for processing, while the condensable gases and hot water are sent to a reactor hotwell 42 for subsequent passage to a filter 32.

Filter 32 is typically a multistage filter, preferably a four-stage filter as shown. The reactor slurry is passed into the filter's first stage via line 34. At the first stage, the product phosphoric acid is removed from the reactor slurry and sent off to suitable storage means via a line 43. Vent gases are sent off from filter 32 to the aforementioned fume scrubber via line 33. The filter cake from the first stage is passed along to the filter's second stage, where it is combined with filtrate recycled from the third stage (returned through a line 44) and processed so as to remove additional phosphoric acid. This phosphoric acid is returned to reactor 24 via the aforementioned line 28 for use in process control. The third stage of filter 32 processes the filter cake from the second stage along with filtrate recycled back from the fourth stage (returned via a line 46). The fourth stage of filter 32 processes filter cake from the third stage plus the product of reactor hot well 42 (delivered via line 48). The fourth stage may also process contaminated pond water delivered to the filter by a line 52 for washing purposes. Evacuated vapors at reduced pressure from filter 32 are sent to a filter vacuum system via a line 53. The residue from the fourth stage, primarily gypsum and acidic hot water, is passed to a storage tank 54 where additional water from either line 50 or 51 is added. The resulting slurry is deposited onto a gypsum pile 56 located adjacent to a cooling pond 58 containing contaminated pond water. The acidic hot water in the residue from the fourth stage of filter 32 eventually percolates out of the gypsum pile and down into the pond. The highly acidic water in the cooling pond is thereafter directed back to the production plant via the aforementioned line 18 for use in refluidizing the rock in refluidizing apparatus 16, or recycled via line 40 to the cooling section of barometric condenser 38, or recycled via line 52 for use in the fourth stage of the filter 32. The remainder of the highly acidic water in the cooling pond is treated in a water treatment plant 60 to reduce its acid content (typically by the addition of lime) before being discharged into a surrounding fresh water system.

EXAMPLE

The following Table I provides data illustrating operation of that part of the system enclosed by dotted line 2. In the illustrated example, the fresh water supplied by fresh water make-up line 12 is at a temperature of about 25° C.; the slurry of ground phosphate rock and fresh water being passed from ball mill 6 to dewatering apparatus 14 is at a temperature of about 50° C.; the fresh water in fresh water recycle line 10 is at a temperature of about 50° C.; the dewatered phosphate rock passed from dewatering apparatus 14 to refluidizing apparatus 16 is at a temperature of about 50° C.; the pond water in line 18 is at a temperature of about 35° C.; and the pond water slurry sent from refluidizing apparatus 16 to storage tank 20 is at a temperature of about 40° C. T,0160

In Table I, the term STPD stands for short tons per day, and the term GPM stands for gallons per minute.

MODIFICATIONS OF THE PREFERRED EMBODIMENT

It is, of course, possible to modify the preferred embodiment of the present invention without departing from the scope of the invention.

Thus, for example, the fresh water make-up added to the system via line 12 may comprise pond water which has been treated with lime to neutralize its acidity.

Similarly, the ground rock entering refluidizing apparatus 16 may be refluidized via line 62 with a portion of the hot acidic water recovered in stage #4 of filter 32, instead of or in addition to the pond water introduced by line 18. As an alternative measure, the ground rock entering refluidizing apparatus 16 may be refluidized with the phosphoric acid recovered in stage #2 of the filter and delivered to apparatus 16 via a line 64, instead of or in addition to the pond water introduced via line 18, or instead of or in addition to the aforementioned stage #4 filtrate introduced via line 62.

Furthermore, a screw transporter or other equivalent means may be utilized in place of belt conveyor 8 to move mined phosphate rock from storage bin 4 to ball mill 6.

Alternatively, the apparatus enclosed by the dotted line 2 may be utilized in conjunction with phosphoric acid production systems other than the one shown in FIG. 1.

It is also envisioned that wet ball mill 6, dewatering apparatus 14, and refluidizing apparatus 16 need not constitute separate elements disposed at separate locations. Rather, it is contemplated that two or more of these devices or stages may be combined so as to form a compound arrangement e.g. dewatering apparatus 14 and refluidizing apparatus 16 may be combined into one unit which alternately dewaters and refluidizes.

Furthermore, it is contemplated that one might replace ball mill 6 with an equivalent rod mill of the sort well known in the art.

Still other modifications will be obvious to one skilled in the art, and are considered to fall within the scope of the present invention.

ADVANTAGES OF THE INVENTION

By using the present invention, wet grinding of the phosphate rock may be conducted substantially free of the aforementioned problems of fresh water consumption, contaminated water production, ball mill corrosion, fluorine evolution, scaling of the rock slurry lines, and interference with essential chemical reactions occurring in the reactor.

What I claim is:

1. A method for conducting wet grinding of phosphate rock in the production of phosphoric acid by reacting phosphate rock with sulphuric acid comprising the steps of:
   (1) wet grinding phosphate rock in fresh water at a first stage so as to form a first slurry comprising ground rock and fresh water:
   (2) sending said first slurry from said first stage to a second stage;
   (3) dewatering said first slurry at said second stage so as to recover most of the fresh water and leave substantially only wet round rock;
   (4) recycling the fresh water recovered at said second stage back to said first stage for use in further wet grinding;
   (5) sending said ground rock from said second stage to a third stage;
   (6) refluidizing the ground rock at said third stage with an aqueous liquid derived from treating phosphoric acid produced by the wet process methods, so as to form a second slurry; and
   (7) thereafter passing said second slurry on to a reactor for reaction with sulphuric acid so as to produce phosphoric acid by the wet process method.

2. A method according to claim 1 wherein said aqueous liquid comprises water recycled from a cooling pond.

3. A method according to claim 1 wherein the liquid effluent from said reactor is a hot phosphoric acid liquid, and further wherein said aqueous liquid is derived from said said hot phosphoric acid liquid.

4. A method according to claim 1 wherein said aqueous liquid comprises an aqueous phosphoric acid.

5. A method according to claim 1 wherein said fresh water comprises neutralized pond water.

6. A method according to claim 1 wherein said wet grinding is conducted in a ball mill.

7. A method according to claim 1 wherein said dewatering is conducted in a vacuum filter, a pressure filter, a belt filter, or a centrifuge.

8. A method according to claim 1 wherein said refluidizing is conducted in a mixing tank.

9. A method according to claim 1 wherein at least two of the steps of grinding, dewatering and refluidizing are conducted in the same apparatus.

10. A method for conducting grinding of mined phosphate rock for use in the production of phosphoric acid by the wet process, said method comprising the steps of:
    (1) wet grinding phosphate rock in fresh water so as to form a first slurry comprising ground phosphate rock and fresh water;
    (2) dewatering said first slurry so as to separately recover at least approximately 80% of said fresh water and wet ground rock;
    (3) refluidizing said recovered ground rock with acidic water containing phosphoric acid so as to form a second slurry;
    (4) passing said second slurry on to a reactor for reaction with an acid so as to produce phosphoric acid; and
    (5) recycling said fresh water for use in further wet grinding of phosphate rock.

11. A method according to claim 10 wherein said acidic water comprises acidic pond water.

12. A method according to claim 10 wherein said acidic water comprises hot acidic water recovered from a filtration system for treating the effluent of said reactor.

13. A method according to claim 12 wherein said acidic water is a dilute phosphoric acid recovered from said filtration system.

14. A method according to claim 10 wherein said fresh water comprises neutralized pond water.

15. A method according to claim 10 wherein said wet grinding is conducted in a ball mill.

16. A method according to claim 10 wherein said dewatering is conducted in a vacuum filter, a pressure filter, a belt filter, or a centrifuge.

17. A method according to claim 10 wherein said refluidizing is conducted in a mixing tank.

18. A method according to claim 10 wherein at least two of said steps of grinding, dewatering and refluidizing are conducted in the same apparatus.

19. A method for producing phosphoric acid by reacting phosphate rock with sulphuric acid in a reactor in a medium comprising phosphoric acid, said method comprising the steps of:
    (1) wet grinding phosphate rock in fresh water so as to form a first slurry comprising ground rock and fresh water:
    (2) sending said first slurry from said first stage to a second stage;
    (3) dewatering said first slurry at said second stage so as to recover most of the fresh water and leave substantially only wet ground rock;
    (4) recycling the fresh water recovered at said second stage back to said first stage for use in further wet grinding;
    (5) sending said ground rock from said second stage to a third stage;
    (6) refluidizing the ground rock at said third stage with an alternative fluid so as to form a second slurry, said alternative fluid comprising (a) pond water, or (b) an acidic aqueous liquid derived from the reaction product stream from said reactor; and
    (7) thereafter passing said second slurry on to said reactor for reaction with sulphuric acid so as to produce phosphoric acid.

20. A method according to claim 19 wherein a reaction product stream comprising phosphoric acid and gypsum is recovered from the reactor, and further including the steps of treating said reaction product stream to separately recover a first fraction rich in phosphoric acid and a second fraction comprising gypsum and phosphoric acid, recovering a dilute aqueous stream of phosphoric acid from said second fraction, and recycling said dilute aqueous stream to said reactor.

21. A method for producing phosphoric acid by reacting phosphate rock with sulphuric acid in a reactor comprising the steps of continually:
 (1) wet grinding phosphate rock in a solution consisting of fresh water so as to form a first slurry comprising ground rock and fresh water:
 (2) sending said first slurry from said first stage to a second stage;
 (3) dewatering said first slurry at said second stage so as to recover most of the fresh water and leave substantially only wet round rock;
 (4) recycling the fresh water recovered at said second stage back to said first stage for use in further wet grinding;
 (5) sending said ground rock from said second stage to a third stage;
 (6) refluidizing the ground rock at said third stage with an aqueous acidic solution so as to form a second slurry,
 (7) passing said second slurry on to a reactor;
 (8) reacting said second slurry with sulphuric acid in said reactor so as to produce a mixture of phosphoric acid and gypsum;
 (9) treating said mixture so as to separately recover phosphoric acid and gypsum;
 (10) washing the recovered gypsum with an aqueous solution so as to produce a wash water containing phosphoric acid; and
 (11) recycling said wash water to said reactor.

* * * * *